US006553308B1

(12) United States Patent
Uhlmann et al.

(10) Patent No.: US 6,553,308 B1
(45) Date of Patent: Apr. 22, 2003

(54) VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE

(75) Inventors: Eugenie V. Uhlmann, Tucson, AZ (US); Desmond J. O'Farrell, Holland, MI (US); Kenneth Schofield, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/561,023

(22) Filed: Apr. 28, 2000

Related U.S. Application Data

(60) Provisional application No. 60/131,593, filed on Apr. 29, 1999.

(51) Int. Cl.[7] .................. G08G 1/123; G01C 21/00; G01C 15/00
(52) U.S. Cl. .................. 701/208; 701/200; 340/988
(58) Field of Search ................. 701/200, 207, 701/24, 208, 213, 300, 36, 209, 2; 340/286.01, 988, 995, 990

(56) References Cited

U.S. PATENT DOCUMENTS

| 5,485,161 A | * | 1/1996 | Vaughn ............... 342/357 |
| 5,519,621 A | * | 5/1996 | Wortham ............ 364/460 |
| 5,751,246 A | * | 5/1998 | Hertel ................ 342/357 |
| 5,808,566 A | * | 9/1998 | Behr et al. ........... 340/995 |
| 5,848,373 A | * | 12/1998 | DeLorme et al. ..... 701/200 |
| 5,867,801 A | * | 2/1999 | Denny ................ 701/35 |
| 5,938,721 A | * | 8/1999 | Dussell et al. ........ 701/211 |
| 5,959,577 A | * | 9/1999 | Fan et al. ............ 342/357.13 |
| 5,987,381 A | * | 11/1999 | Oshizawa ............ 701/209 |
| 6,067,500 A | * | 5/2000 | Morimoto et al. ..... 701/209 |
| 6,094,618 A | * | 7/2000 | Harada ............... 701/207 |
| 6,097,316 A | * | 8/2000 | Liaw et al. ........... 340/988 |
| 6,148,261 A | * | 11/2000 | Obradovich et al. ... 701/208 |
| 6,185,501 B1 | * | 2/2001 | Smith et al. .......... 701/200 |
| 6,212,470 B1 | * | 4/2001 | Seymour et al. ...... 701/207 |

* cited by examiner

Primary Examiner—Tan Q. Nguyen
Assistant Examiner—Dalena Tran
(74) Attorney, Agent, or Firm—Van Dyke, Gardner, Linn & Burkhart, LLP

(57) ABSTRACT

A vehicle-based navigation system is described including a position locator that establishes the geographic position of the vehicle and a map database located external to and remote from the vehicle. The system determines at least one of a vehicle parameter and a personal parameter, and transfers data from the remote map database to the vehicle and displays the data in the vehicle at a resolution that is a function of at least one of a vehicle parameter and a personal parameter.

61 Claims, 3 Drawing Sheets

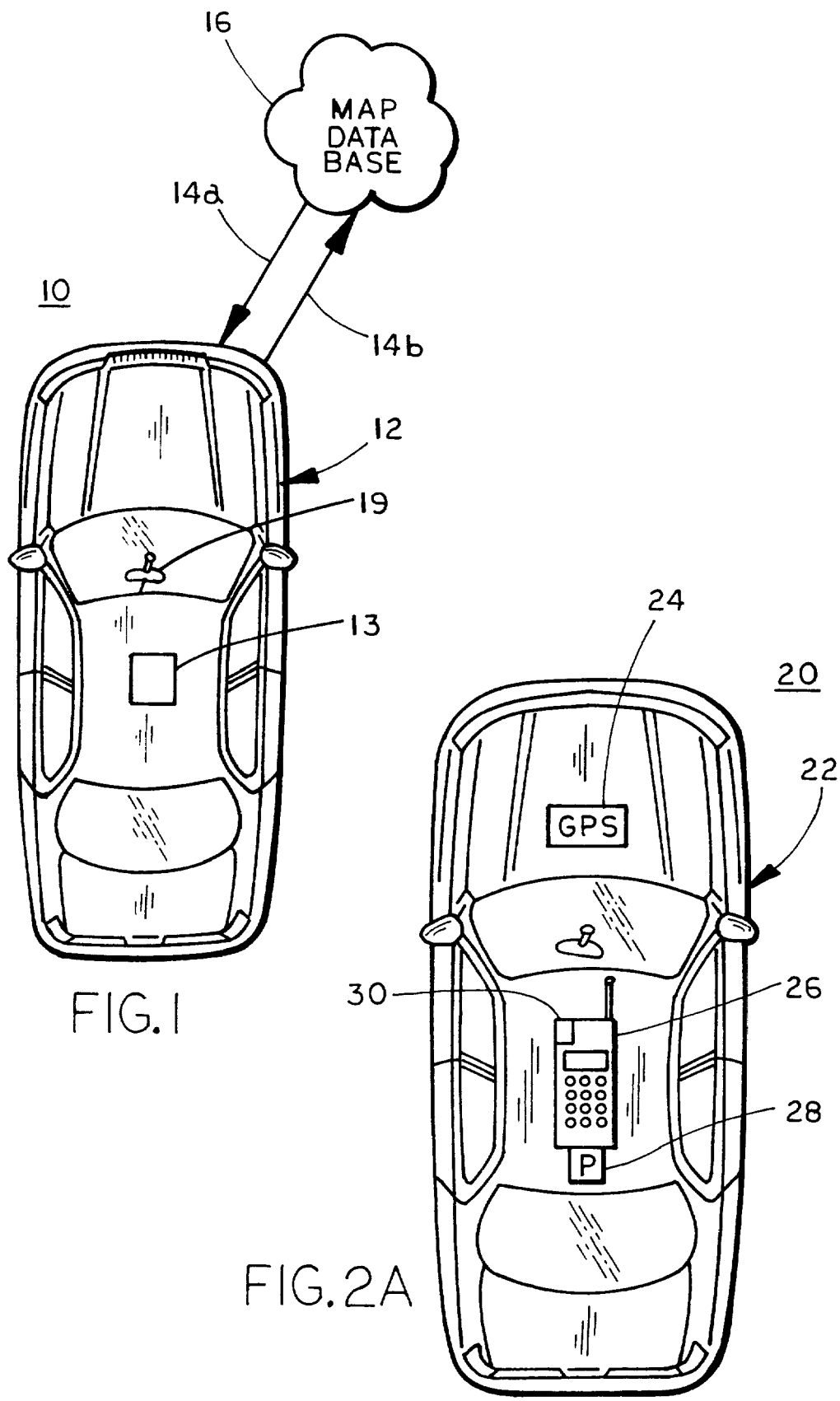

VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE

CROSS-REFERENCE TO RELATED APPLICATION

This application claims priority from provisional patent application Ser. No. 60/131,593 filed on Apr. 29, 1999.

BACKGROUND OF THE INVENTION

The present invention is directed to a method of navigating and, in particular, to a method of navigating in a vehicle. More particularly, the invention is directed to a vehicle-based navigation system with smart map filtering, portable unit home-base registration, and multiple navigation system preferential use.

Position locators, such as Global Positioning System (GPS) receivers, signal triangulation receivers, compass-based systems, and inertial navigation systems, and the like, have become common in electronic devices, in general, and are particularly used in vehicles. The popularity of such systems is driven by consumer demand, low-cost electronics, and federal legislation which dictates that certain devices, such as cellular telephones, have position-locating capabilities. Position-locating technology is frequently used with mapping programs which provide map data, and the like, to aid in the determination of location and direction. Other related data, such as restaurants, shopping centers, street names, and scenic sites, often accompanies the map data. In addition to cellular telephones and vehicle-based installations, position locators may be included with other portable devices, such as Personal Digital Assistants (PDAs).

The widespread use of devices having position locators has caused certain redundancies to occur. For example, a consumer may have a position locator in his/her cellular telephone, PDA, or the like, and a position locator as a part of a vehicle-based navigation system. Indeed, it is expected that, in the future, vehicles will include a port which holds a portable device, such as a cellular telephone or a PDA, when the vehicle is in use and the portable device is removed when the occupant leaves the vehicle.

Map data from a map database is useful with a position locator in order to aid in the determination of location and/or direction. It is common to reside the map database, in whole or in part, in a vehicle-based storage device. For example, the map database could be provided on a CD ROM device which is useful with a CD reader included with the vehicle-based navigation system. Alternatively, a portion of a database could be downloaded to a local memory such as a flashcard at the beginning of a journey for use with that journey. All such devices require physical manipulation of a data storage media in order to transfer the map database to the vehicle. Such manual manipulation could be eliminated by residing the map database externally of the vehicle and transferring map data and related data to the vehicle on a real-time basis, such as over a communication link, which may be in the form of an RF communication channel. The problem with such systems is that the extent of the data transfer requirements would overwhelm the bandwidth capabilities of commercially available communication links.

BRIEF DESCRIPTION OF THE DRAWINGS

FIG. 1 is a diagram of a smart map filtering method according to the invention;

FIGS. 2a and 2b are diagrams of a portable unit with home-base registration;

DESCRIPTION OF THE PREFERRED EMBODIMENT

Figure 2B:
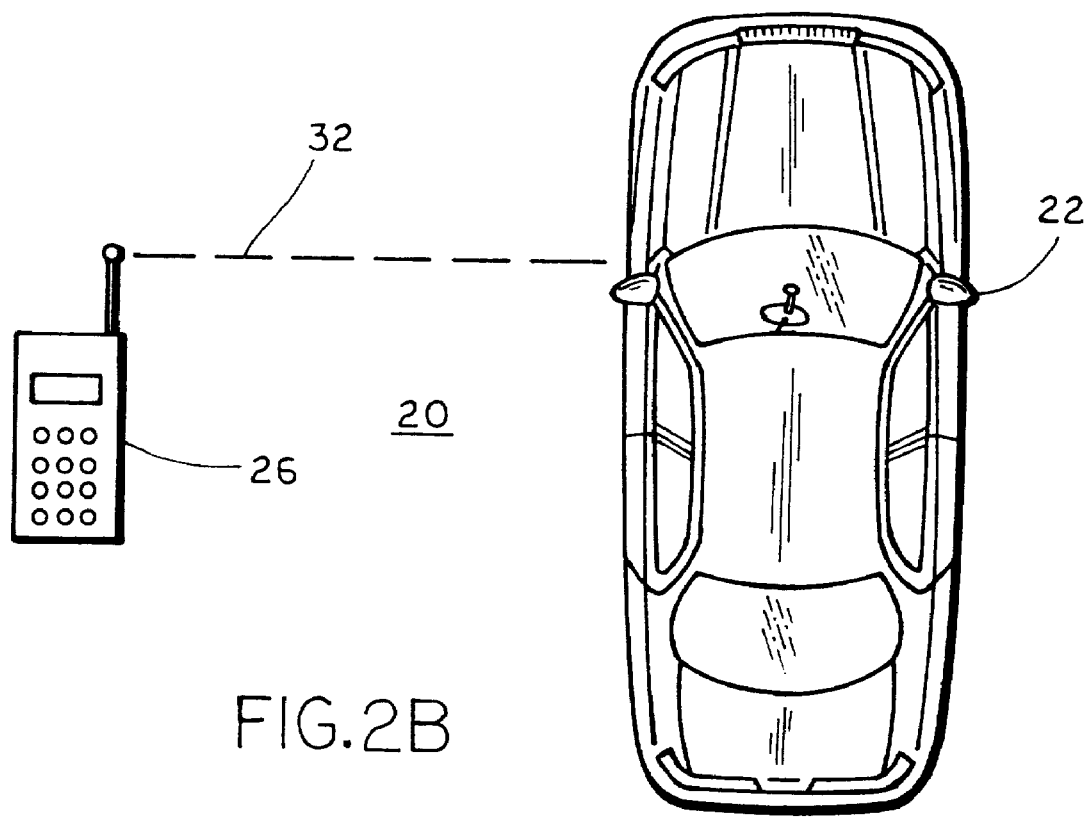

Referring now specifically to the drawings, and the illustrative embodiments depicted therein, FIG. 1 describes a method of navigating that utilizes an adaptive system 10 utilizing smart map filtering that includes a vehicle-based navigation system 13 and a communication link 14, preferably a wireless link such as via radio frequency (RF) or microwave telecommunication, between vehicle 12 and a map database 16. In the illustrated embodiment, map database 16 is located remote from vehicle 12. Vehicle 12 is a road transportation vehicle such as an automobile, bus, truck or van. Communication link 14, which is a two-way link, includes communication of map data from database 16 to vehicle 12, as illustrated at 14a, and communication of information such as speed information from vehicle 12 to database 16, as represented by 14b. Various information can be communicated from vehicle 12 to database 16 and from database 16 to vehicle 12. Such information can include identification of the driver or vehicle (for example, that the vehicle is part of a particular rental fleet or that the driver is a subscriber to the remote service provider of database 16), authorization for the driver or vehicle to access database 16, payment by the driver/vehicle to access or transact with database 16, information on the language/dialect understood by the driver and desired communication from database 16 to vehicle 12, credit information, and the like. Such information communicated from vehicle 12 to remote database 16 can include the geographic location of the vehicle, its velocity and heading while travelling on a road, its altitude above sea level, its inclination, and the type of vehicle and its equipment level so that the data sent from database 16 to vehicle 12 is appropriate for the level/model of equipment/display in the vehicle. Such information communicated from vehicle 12 to remote database 16 can also include a request/preference by the driver for a particular level of map detail/area display/detail density and the like. Map data transferred from database 16 to vehicle 12, such as at 14a, preferably has a particular resolution determined, most preferably, by driver preference and/or by driver authorization and/or by driver experience and/or by driver payment and/or by equipment/display capability in the vehicle and/or by vehicle velocity and/or by vehicle location and/or by vehicle heading and/or by vehicle type or model. Map data resolution establishes the capability of distinguishing individual features of the map segment. In particular, higher resolution map data includes more details, such as individual city streets and landmarks; whereas, coarser resolution map data may include fewer details, such as only thoroughfares, interstate highways, and exit information. The skilled artisan would understand that there is a wide range of information that could be encompassed within the definition of map data resolution. Map data may include related data, such as restaurants, shopping centers, street names, and the like. The display of map data to the driver is thus adaptive to the particular driving condition at the moment of display, and the resolution of the data displayed is a dynamic function of vehicle and personal parameters. Thus, the resolution and/or detail of information displayed to and/or presented to (such as audibly) the driver located within the interior cabin of the vehicle can dynamically adapt in accordance with a vehicle parameter of the vehicle, such as vehicle speed or location or model or equipment type or heading/direction of travel or vehicle authorization, or in accordance with a personal parameter of a person such as of an occupant of the vehicle such as of the driver and/or of a passenger (such as driver/occupant identity, driver/occupant preference for a particular level of information resolution and/or detail such as might be manually input or such as might be stored in a memory in the vehicle, driver authorization, driver credit, driver national identity, driver linguistic, and the like), and in accordance with a driving condition at a particular time and/or at a particular location.

In operation, vehicle-based navigation system 13 conveys speed data, and/or other information as described above, to map database 16. Map database 16 loads map data at a resolution that, preferably, varies inversely with vehicle speed. In particular, if a vehicle is traveling at a relatively high speed, such as along a highway (such as a rural highway), map database 16 would download information along that highway at a relatively coarse resolution. For example, the map data may include exits off of the highway, but not include details of the local streets. It is possible to superimpose related data, such as restaurant information, along each of the exits of the expressway. When vehicle 12 approaches a city or residential area, the location of the vehicle is identified by vehicle-based navigation system 13 (that, for example, can be in-vehicle GPS system that includes a GPS antenna), this is transmitted to the remote database, the vehicle's proximity to an urban center/area is recognized by remote database 16 and, therefore, the proximity of the vehicle to a city/residential zone automatically causes map database 16 to download map data at a finer resolution. Thus, a dynamic map resolution function is provided to the system. Such dynamic map resolution function can be responsive to a variety of vehicle conditions and/or driver preferences/authorizations. These include vehicle location (for example, traveling on a rural highway or on a city/residential highway, whether slowing down to approach an exit on a highway or upon exiting a highway, whether speeding up upon entering a highway via an entry ramp, whether slowing down or speeding up upon entering or exiting a residential area, and the like). Therefore, for example, the map database may download map data of local streets in an area, for example, a three mile radius around the vehicle, when the vehicle is traveling at a relatively slow speed commensurate with city driving or when the vehicle is stopped. This is based upon a recognition that both the rate of vehicle travel and the detail required vary as a function of vehicle speed, and/or other factors as described above. When, for example, vehicle 12 approaches a city or residential area and slows down, system 10, recognizing the geographic location of the vehicle and recognizing its proximity to a city or residential area, and recognizing that the vehicle has slowed down (system 10 can deduce this by interpretation of GPS data from the vehicle and/or for a speed sensor transducer in the vehicle that provides a signal and/or data to system 10 indicative of the speed of vehicle 12), can cause the download of data from map database 16, and its display to the driver in the vehicle cabin, to be of a finer resolution so as to display map details such as more side streets, intersections, buildings, etc., than when the vehicle had been traveling faster. Likewise, when system 10 recognizes that vehicle 12 is approaching a desired highway ingress or exit ramp, a finer map resolution than previously can be displayed.

Figure 4:
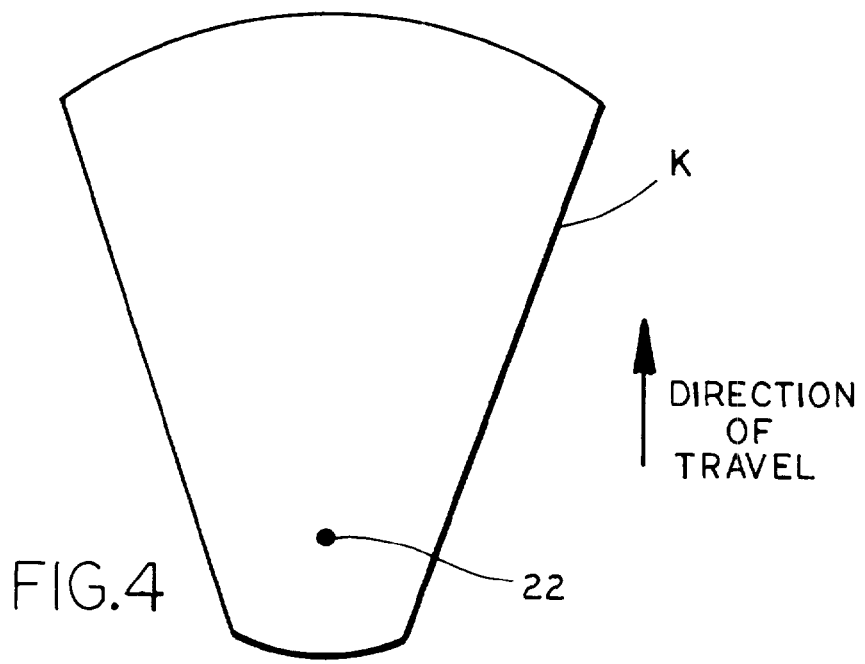
FIG. 4 is a diagram of a geographic area in which data is provided in relationship to the direction of vehicle travel.

By varying the resolution of data with a vehicle parameter of the vehicle, such as vehicle speed or location or model or equipment type or heading/direction of travel or vehicle authorization, or by varying the resolution of data with a personal parameter of a person such as of an occupant of the vehicle such as of the driver and/or of a passenger (such as driver identity, driver/occupant preference for a particular level of map resolution such as might be manually input or such as might be stored in a memory in the vehicle, driver authorization, driver credit, driver national identity, driver linguistic, and the like), the information displayed to the driver can dynamically adapt to best suit the driver's needs at a particular moment and/or for a particular driving condition. Also, the capability of the data bandwidth over communication link 14 may remain substantially constant. The faster the vehicle travels, the larger the circle of geographic area in which data is provided and the less the data density becomes. In order to increase the available information to the user, it may be desirable to make the information coverage area biased in the direction of travel of the vehicle. For example, information coverage area may be configured, presented or deformed into a forward-facing shape, such as a cone K, with the majority of the data area in the direction of vehicle travel (FIG. 4). This provides more data forward of the vehicle, where the information will likely be useful while providing some data in the area in which the vehicle has already traveled, if desired.

The resolution of map data presented by system 10 to the driver can also provide an indication or a warning to the driver that a decision point or desired destination is being approached. For example, if a driver is traveling in a vehicle along a highway and is within a predetermined distance (such as 3 miles) from the desired final destination (or required turn), the map resolution displayed by system 10 can then automatically adjust to a higher resolution in order both to alert the driver of the imminence of a decision point and to provide the necessary map information to guide the driver. Alternatively, if the driver does not need to make any turns, maneuvers, or the like, a coarser map resolution can be provided. Also, since cruise control is usually selected only when travelling above a slow speed and when turns and the like are not anticipated, selection of cruise control of the vehicle speed (by the driver or automatically by an adaptive cruise control system), as conventionally known in the art, can optionally set the resolution of map detail displayed to the driver from the in-vehicle navigational system to a lower resolution (coarser detail) and disengagement of the cruise control by the driver can cause the resolution of the display of map detail to the driver from the in-vehicle navigational system to change to a higher resolution (finer detail) than when cruise control was engaged.

Also, and optionally, other vehicle functions can dynamically adapt under control of a system such as system 10 of FIG. 1. For example, a dynamic vehicle function can be provided for a hybrid-powered vehicle (that is equipped with both electric power and non-electric power such as internal combustion power for propulsion). When the in-vehicle navigational system detects that the vehicle is approaching an urban area or is leaving a highway to enter a residential area, the propulsion of the vehicle can be changed from internal combustion drive to electric drive. Also, should an adaptive system such as system 10 estimate that the distance to the desired target destination will exceed the electric power capacity of the electric drive system of the hybrid vehicle, then the drive can be automatically shifted to non-electric drive. Similarly, should the vehicle be equipped with a 2/4-wheel drive system such as an all-wheel drive as known in the art, a system such as system 10 can determine to shift from 4-wheel drive to 2-wheel drive dependent on inputs to system 10 from sensors in the vehicle of vehicle speed, direction, traction, loading, inclination and from GPS-derived information as to vehicle location, heading, the type of road being traveled on, altitude, and the like, as well as other vehicle parameters and personal parameters such as the type of vehicle, experience of the driver, etc. Similarly, the traction of a vehicle and/or the suspension of the vehicle can be dynamically adapted dependent on a vehicle parameter and/or a personal parameter to suit a particular driving condition/location. Thus, for example, and referring to FIG. 1, should vehicle 12 be driving on a road during a snow/ice condition, then database 16, knowing the geographic location of vehicle 12 by wireless communication from vehicle 12 to database 16 of the vehicle's instantaneous location as determined by in-vehicle navigational system 13, and database 16 knowing the local weather conditions at that location (or, alternately, database 16 linking to a data source to provide this local weather information) and recognizing that local icing conditions exist, database 16 can communicate back via wireless communication (via an RF link or a microwave link or a radio link) control data to vehicle 12 to set a parameter of the vehicle, such as traction, suspension, tire pressure, or the like, to a condition that best suits driving at that location and experiencing that particular weather condition.

Further, and optionally, database 16 of system 10 can be loaded/programmed with specific driving instructions that then guide/direct the driver to desired destinations. Thus, should a driver frequently make a particular journey, or have found a particularly preferred route, then this can be stored in database 16 for retrieval and use by that driver whenever desired. Also, should a driver require directions to a particular remote location such as a hotel in a remote location from, for example, the driver's home, then that hotel can communicate the desired directions/route to database 16, and the driver can then access these when making the journey from his/her home to that hotel. Thus, a preprogrammed direction function is provided to system 10.

The present invention further includes a dynamic traffic control function wherein the geographic position and heading of a plurality of vehicles is dynamically provided to a traffic control center, and based on the information provided by wireless communication by, preferably, many hundreds to thousands of vehicles to the traffic control center regarding traffic location and individual vehicle direction/travel intent, then traffic control elements such as traffic lights, speed limits, traffic signs, and the like, can be set dynamically in accordance with dynamic traffic conditions in a locality. Thus, for example, data from such as system 10 of FIG. 1 could be wirelessly communicated to a traffic control center, and vehicle 12, in turn, could receive data back from the traffic control center (via wireless communication) updating on local traffic conditions and/or causing database 16 to display in vehicle 12 the least traffic-congested route to the destination desired by the driver/in the local area of the vehicle.

Also, emergency vehicles such as police cars, ambulances, fire trucks, and the like, can communicate via wireless communication to a vehicle such as vehicle 12 causing an alert (such as an audible alert or a visual alert such as an icon or display) being set off within the vehicle cabin alerting the driver to make way for the emergency vehicle. Also, the location of the emergency site can be communicated to database 16, and any route displayed therefrom in the vehicle cabin can be adjusted to guide the driver of vehicle 12 away from the location of the emergency event, if in his/her line of intended travel. Thus, vehicle 12 is guided away from the emergency event, thus avoiding potential traffic congestion for vehicle 12, and potential traffic impediment for the emergency vehicle seeking to reach the emergency event.

Also, database 16 such as in system 10 can automatically alert the driver when approaching a train crossing, and so help prevent train-vehicle collisions. Further, most if not all locomotives are equipped with a GPS system and they are in wireless communication with a train system control center. This present invention includes a dynamic train crossing control system which, upon identifying that a train is approaching a particular train rail/road crossing that crosses a particular road, communicates the imminent approach to (or crossing of) that particular road/rail track crossing by a train (by wireless telecommunication) to database 16 (or alternately, directly to vehicle 12 such as via an ONSTAR™ link to that vehicle) which, in turn, alerts the driver of the train crossing event should system 10 determine that vehicle 12 is on a route that will intersect with that train as it crosses that particular train crossing. By a display and/or alarm in vehicle 12 being alerted by system 10 (such as by sounding an audible alert or providing a visual alert such as a warning display in vehicle 12, such as at interior mirror assembly 19) of the train rail/road crossing event that will imminently occur or that is actually occurring in the path of vehicle 12, the driver of vehicle 12 can take appropriate action to avoid any collision. Should the driver of vehicle 12 fail to take heed of the train approaching the crossing in the path of vehicle 12, then this can be communicated back to the train (by wireless communication), providing a potential opportunity for the train driver to take action to avoid a train-vehicle collision.

Figure 5:
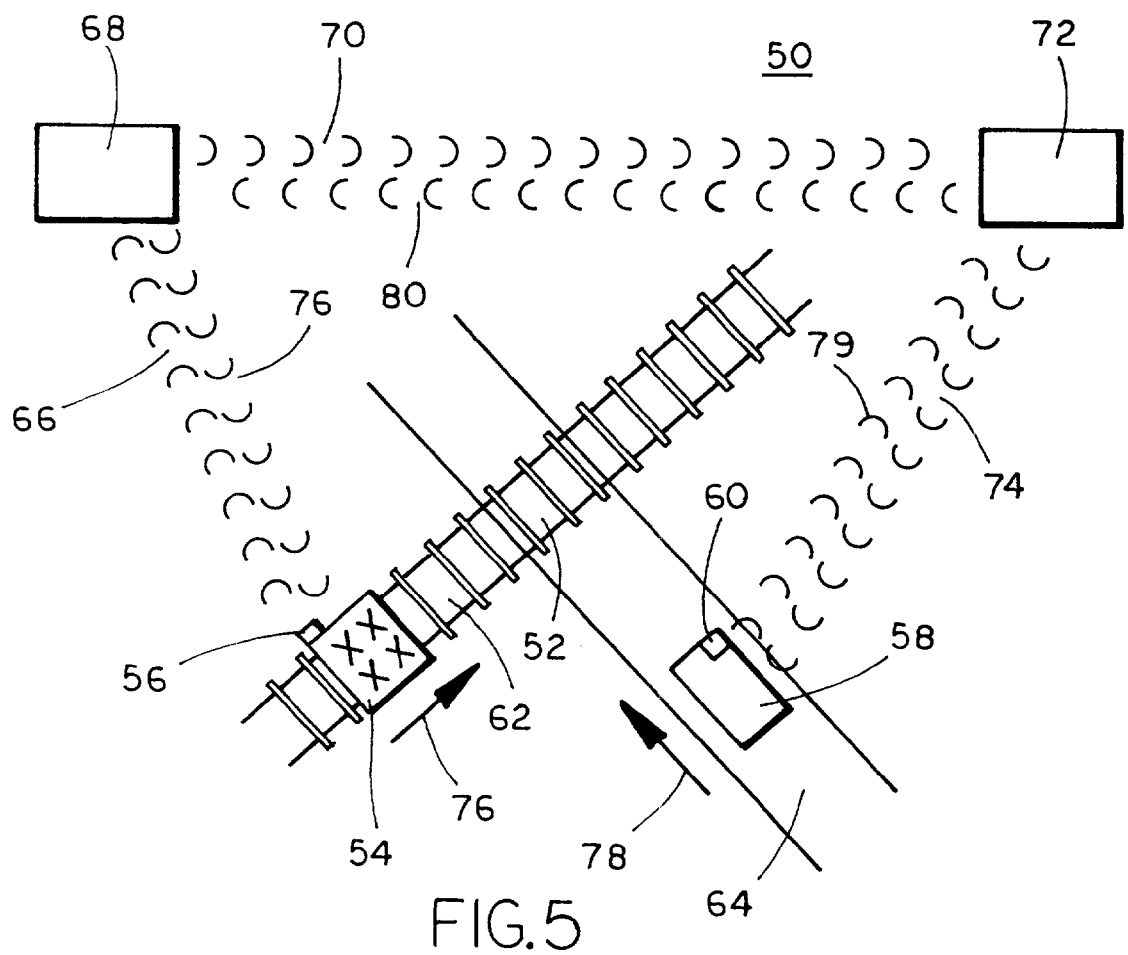
FIG. 5 is a diagram of a dynamic train crossing control system.

FIG. 5 illustrates a dynamic train crossing control system 50 of the present invention. Train 54 (that is equipped with a navigational system 56, preferably a GPS system, that can identify the location, direction and/or speed of train 54) is traveling in direction 76 towards rail/road crossing 52 on rail track 62. Vehicle 58 (that is equipped with a navigational system 60, preferably a GPS system, that can identify the location, direction and/or speed of vehicle 58) is traveling in direction 78, also towards rail/road crossing 52. As train 54 approaches crossing 52, a train locator signal 66 (derived from navigational system 56 that functions as a position locator for the train) is wirelessly transmitted to a train control center 68. Train control center 68, in turn, transmits an alert signal 70 to telematic center 72 (that, for example, is an ONSTAR™ service provider or a Web site or a computer site, or an intelligent highway control center or a traffic control center), preferably by wireless transmission. As vehicle 58 approaches crossing 52, a vehicle locator signal 79 (derived from navigational system 60 that functions as a position locator for the vehicle) is wirelessly transmitted to telematic center 72. Telematic center 72, knowing of the imminent arrival of train 54 at crossing 52, transmits by wireless communication a train approach signal 74 to vehicle 58 in order to alert the driver of the vehicle that a train is approaching the rail/road crossing ahead. A signal device, such as an audible alarm or a visual display/icon, is activated in the vehicle to alert the driver to the situation. Also, telematic center 72, optionally, can transmit a signal 80 to train control center 68 alerting it to the imminent approach of vehicle 58 to crossing 52. A signal 76 is thereupon transmitted from train control center 68 to train 54 to alert the train driver of the approach of a vehicle to the crossing ahead.

Variations on this system are possible, while still remaining within the scope of the present invention. For example, train 54 can transmit data directly to telematic center 72 and/or receive data directly from telematic center 72. Also, optionally, vehicle 58 can transmit data to train control center 68 and/or receive data directly from train control center 68. Further, the system illustrated in FIG. 5 can be utilized to control traffic approach to any form of intersection besides a rail/road intersection. For example, a road traffic control system can utilize the concepts described above to dynamically control operation of traffic lights at an intersection, or to operate a drawbridge. Also, a telematic service, such as ONSTAR™, can receive either directly from a train, or as a feed from a train control center such as AMTRAC operate, the location of a train as it travels on a track, and the telematic service can then provide a train crossing alert as an extra feature to the features currently conventionally provided to drivers linked in their vehicles to the remote telematic service. Given the frequent occurrence of train/vehicle collisions, addition of this novel feature will assist road safety, and enhance the value of telematic services such as ONSTAR™ and RESCU™.

Thus, it is seen that map data is provided which is useful to the vehicle operator for the particular operating environment of the vehicle and/or the particular driver needs or preferences or the level of authorization allowed/payment made. As will be apparent to the skilled artisan, other parameters, besides vehicle speed, could be utilized. For example, the manual input could be provided to allow the driver to select the resolution of data desired. Other selection techniques may suggest themselves to the skilled artisan.

In another vehicle-based navigation system 20 (FIGS. 2*a* and 2*b*), a vehicle 22 includes a navigation system 24, such as a GPS. A portable device 26 is removably coupled with vehicle 22 through a communication port 28. Coupling of portable device 26 with vehicle 22 is preferably by radio-frequency link, infra-red link, radio link or satellite link, or any combination thereof. Portable device 26 additionally includes a position locator 30 which establishes the position of portable device 26. For example portable device 26 may comprise a cellular hand-held mobile phone that is equipped with a position locator circuit/feature that identifies the geographical location from which a phone call or communication link is being made using that cellular phone. When portable device 26 is removed from port 28, such as when the occupant leaves vehicle 22, an optional communication link 32 provides data exchanged between portable unit 26 in vehicle 22 in a manner which will be described below. Examples of docking techniques and dockable accessories and of portable devices are disclosed in commonly assigned U.S. patent application Ser. No. 09/449,121 filed Nov. 24, 1999, by Hutzel et al. for a REARVIEW MIRROR ASSEMBLY WITH UTILITY FUNCTIONS, now U.S. Pat. No. 6,428,172, patent application Ser. No. 60/199,676, filed Apr. 21, 2000, by McCarthy et al. for a VEHICLE MIRROR ASSEMBLY COMMUNICATING WIRELESSLY WITH VEHICLE ACCESSORIES AND OCCUPANTS (Attorney Docket No. DON01 P-818), and patent application Ser. No. 09/466,010 filed Dec. 17, 1999, by DeLine et al. for an INTERIOR REARVIEW MIRROR SOUND PROCESSING SYSTEM, now U.S. Pat. No. 6,420,975, the disclosures of which are all hereby incorporated herein by reference.

In operation, while portable unit 26 is engaged with port 28, such as during operation of the vehicle, the position of vehicle 22 may be stored (such as in an electronic digital memory) within portable unit 26 when portable unit 26 is disconnected from port 28. Thereafter, the location of vehicle 22 is retained in portable unit 26 as a "home-base." This allows the user to always be able to locate his/her vehicle when away from the vehicle. Thus, the present invention includes providing a vehicle location identifier function that allows the driver find the location of the vehicle when it is parked, and when the driver is returning to the parked vehicle. This function is especially useful in congested areas, such as urban areas, parking lots, and the like. If portable unit 26 is coupled with vehicle 22 through a communication link 32 (such as a wireless communication such as telematic links such as are described in commonly assigned U.S. patent application Ser. No. 09/449,121 filed Nov. 24, 1999, by Hutzel et al. for a REARVIEW MIRROR ASSEMBLY WITH UTILITY FUNCTIONS, now U.S. Pat. No. 6,428,172, and patent application Ser. No. 09/466,010 filed Dec. 17, 1999, by DeLine et al. for an INTERIOR REARVIEW MIRROR SOUND PROCESSING SYSTEM, now U.S. Pat. No. 6,420,975, the disclosures of which are hereby incorporated herein by reference), then vehicle-based navigation system 24 can communicate map data over communication link 32 to portable unit 26. Communication link 32 could be a radio-link, such as that provided by a cellular telephone, such as the radio-link feature supplied by the Nextel system. In this manner, portable unit 26 can receive high resolution information, such as map data from vehicle 22, and such received information can be displayed to the holder of the portable unit via a display device or via voice generation.

If combined with navigation system 10, navigation system 20 may operate as follows. When vehicle 22 becomes stopped, map data downloaded from map database 16 will typically be of a fine resolution in the area immediately surrounding vehicle 22, such as, for example, a three mile radius around the vehicle. This data may then be communicated to portable unit 26 through port 28. Therefore, as the user removes portable unit 26 from port 28 and travels from the vehicle, the user will have fine resolution map data in an area typically within walking distance of vehicle 22. Should, however, the user get on a mass transit mode of transportation, the user may travel outside of the range of map data loaded in portable unit 26. When the user exits the mass transit, new high resolution map data can be downloaded to vehicle 22 over communication link 14*a* from map database 16 and over communication link 32 to portable unit 26. Alternatively, if the map database resides in vehicle 22, then the fine resolution data could be communicated from the vehicle-based database over communication channel 32 to portable unit 26. Navigation system 20 facilitates communication between portable unit 26 and vehicle 22 in a manner which minimizes bandwidth requirements, thereby enhancing battery life of the portable device. In addition, the communication between the vehicle and the portable device can be used for additional features, such as monitoring the security of the vehicle while parked. For example, portable device 26 can include an audible and/or visible alarm that alerts if the vehicle security system has been activated. The user of portable device 26, typically the intended driver of the parked vehicle, can then choose to either remotely deactivate the vehicle alarm by wireless communication back to the parked vehicle, or can choose to take an action in response to the security alert broadcast wirelessly from the parked vehicle to the mobile portable device 26 (which can be a personal digital assistant, a portable computer, a laptop computer, a palm computer, a notebook computer, a pager, a cellular phone, or the like), such as contacting a security service or the police. Such portable devices preferably incorporate digital computing technology. Optionally, the user of the portable device can choose to broadcast wirelessly back to the parked vehicle a disable code that disables operation of the vehicle, and so help obviate theft. In addition to map database information, navigation system 20 can download related data to portable unit 26 over communication channel 32, such as scenic site information, restaurant information, shopping information, street names, and the like.

Figure 3:
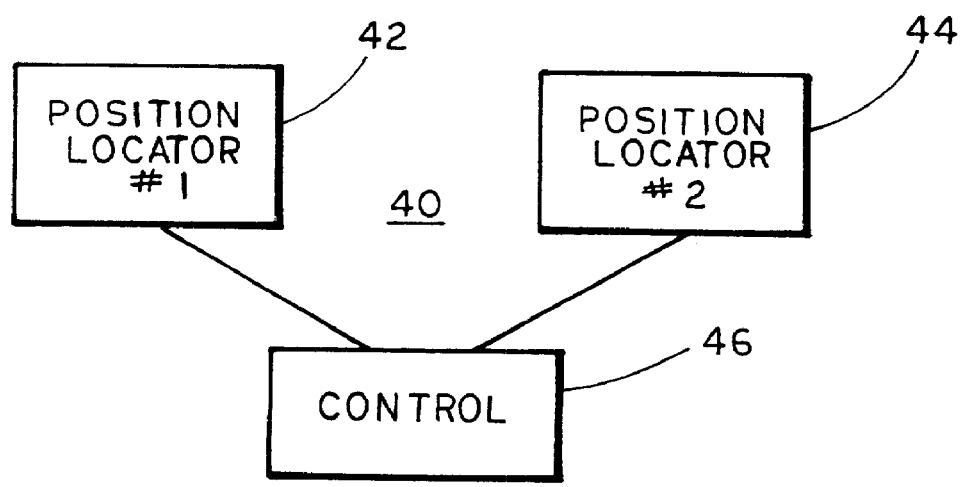
FIG. 3 is a diagram of a multiple navigation system with preferential use.

It is common for vehicle navigation system 24 to be a GPS 24. Such vehicle-based GPS navigation system is disclosed in commonly assigned U.S. Pat. No. 5,971,552 entitled VEHICLE GLOBAL POSITIONING SYSTEM, issued to Desmond J. O'Farrell, Roger L. Veldman and Kenneth Schofield, the disclosure of which is hereby incorporated herein by reference, and commonly assigned provisional patent application Ser. No. 60/187,960 filed Mar. 9, 2000, by McCarthy et al. for a COMPLETE MIRROR-BASED GLOBAL-POSITIONING SYSTEM (GPS) NAVIGATION SOLUTION and provisional patent application Ser. No. 60/192,721, filed Mar. 27, 2000, by Lynam et al. for an INTERACTIVE AUTOMOTIVE REAR VISION SYSTEM (Attorney Docket No. DON01 P-815), the disclosures of which are hereby incorporated herein by reference. It is also common for portable units, such as unit 26, to utilize signal triangulation position location system technology which is especially used in cellular telephones. In certain situations, such as in urban areas among buildings, parking structures, and the like, GPS navigation systems may lose a continuous signal. Under other circumstances, navigation system 30 in portable unit 26 may lose signal. Accordingly, and referring to FIG. 3, a multiple position locator vehicular navigation system 40 having preferential use includes a first position locator 42 and a second position locator 44. First position locator 42 may be a vehicle-based navigation system, such as a GPS-based system 24. Second position locator 44 may be a different type of navigation system, such as navigation system 30 with portable device 26. A control 46 compares the outputs of position locators 42, 44 and determines which position locator is producing the best output. The best output may be a continuous output, a higher accuracy output, or some other quantitative parameter. Control 46 combines the outputs giving preference to the position locator 42, 44 providing the highest quality output. In this manner, with portable unit 26 connected with port 28, vehicle navigation system 20 is less likely to lose navigational signals because the conditions under which navigation system 24 may lose a continuous signal should be different than the conditions under which navigation system 30 loses signal. While navigation system 40 may best be utilized with different types of position-locating devices, it may also be utilized when both position-locating devices utilize the same sensing technology, such as a GPS or the like.

In a further aspect of this present invention, the display of information in a road transportation vehicle, such as map and/or directional data presented to the driver and/or other vehicle cabin occupants, by a display device within the vehicle cabin (preferably a display device such as a video screen located at, on or within the interior rearview mirror assembly such as described in provisional patent application Ser. No. 60/186,520, filed Mar. 1, 2000, by Lynam et al. entitled an INTERIOR REARVIEW MIRROR ASSEMBLY INCORPORATING A VIDEO SCREEN (Attorney Docket No. DON01 P-802)) includes a dynamic zoom function. Conventionally, many commercially available navigation systems show a standard view (such as a local area with streets, cross-streets and the like) with, often, additional control means (such as manual input controls or voice-activated controls) to zoom in or zoom out of a particular level of detail. Often the level of detail provided, and the options thereto, are inadequate or inappropriate for navigation, and can serve as a distraction to the driver. The dynamic map resolution of the present invention provides an automatic, hands-free dynamic zoom capability to the GPS display (or any other display) in the vehicle cabin. In accordance with the present invention, the distraction of the driver is alleviated by providing a dynamic resolution function whereby the resolution of mapping information (or any other type of information being displayed to an occupant of the vehicle such as the driver) is automatically adjusted in accordance with a vehicle parameter and/or a personal parameter applicable at a particular moment/driving condition/driving location so that the information provided is dynamically adjusted to meet the needs of a particular driving task. The data presentation being dynamic, the type of information, such as the level of map information, is varied throughout the total drive.

Also, the map database, such as map base 16 shown in FIG. 1, and which is accessed by wireless communication from a vehicle, such as vehicle 12 of FIG. 1, can be of various types. For example, it can be part of a telematic service provided by or accessed via a vehicular wireless communication system such as ONSTAR™ from General Motors of Detroit, Mich., or RESCU™ from Ford Motor Company of Detroit, Mich. The map database may be a site on the World-Wide Web, accessed from the vehicle via two-way telecommunication with (and linkage to) the INTERNET, such a by telematic access from the vehicle to a map direction Web site such as is at www.mapguest.com. Optionally, the map database can be stored on a dedicated computer, such as a company computer or a personal computer, and with telematic access thereto being provided to and from the vehicle.

Preferably, display of data within the vehicle cabin received from a remote provider such as map database 16 of FIG. 1 is at/on/within or local to the interior rearview mirror assembly such as interior rearview mirror assembly 19 shown in FIG. 1. For example, and referring to FIG. 2a, a mirror-mounted display 25 (such as disclosed in provisional patent application Ser. No. 60/187,960 filed Mar. 9, 2000, by McCarthy et al. for a COMPLETE MIRROR-BASED GLOBAL-POSITIONING SYSTEM (GPS) NAVIGATION SOLUTION) can be located at the interior mirror assembly 29 of vehicle 22. Suitable displays are disclosed in application Ser. No. 09/466,010 filed Dec. 17, 1999, by DeLine et al. for an INTERIOR REARVIEW MIRROR SOUND PROCESSING SYSTEM, now U.S. Pat. No. 6,420,975, and in application Ser. No. 09/396,179 filed Sep. 14, 1999, now U.S. Pat. No. 6,278,377, Ser. No. 09/382,720 filed Aug. 25, 1999, now U.S. Pat. No. 6,243,003, Ser. No. 09/449,121 filed Nov. 24, 1999, now U.S. Pat. No. 6,428,172, Ser. No. 09/433,467 filed Nov. 4, 1999, now U.S. Pat. No. 6,326,613, Ser. No. 09/448,700 filed Nov. 24, 1999, now U.S. Pat. No. 6,329,925, in commonly assigned patent application Ser. No. 09/449,121 filed Nov. 24, 1999, by Hutzel et al. for a REARVIEW MIRROR ASSEMBLY WITH UTILITY FUNCTIONS, now U.S. Pat. No. 6,428,172, provisional application Ser. No. 60/187,960 filed Mar. 9, 2000, by McCarthy et al. for a COMPLETE MIRROR-BASED GLOBAL-POSITIONING SYSTEM (GPS) NAVIGATION SOLUTION and provisional application Ser. No. 60/192, 721, filed Mar. 27, 2000, by Lynam et al. for an INTER- ACTIVE AUTOMOTIVE REAR VISION SYSTEM (Attorney Docket No. DON01 P-815), the disclosures of which are hereby incorporated herein by reference.

Also, the interior mirror assembly can include various accessories or functions such as in commonly assigned U.S. Pat. Nos. 5,959,367 and 6,000,823, the disclosures of which are hereby incorporated herein by reference. The in-vehicle components such as in system 10 of FIG. 1 can be linked by wired connection or by wireless connection such as IR wireless communication or RF communication [such as using the BLUETOOTH protocol such as is available from Motorola of Schaumberg, Ill.], and as disclosed in provisional patent application Ser. No. 60/187,960 filed Mar. 9, 2000, by McCarthy et al. for a COMPLETE MIRROR-BASED GLOBAL-POSITIONING SYSTEM (GPS) NAVIGATION SOLUTION, the disclosure of which is hereby incorporated herein by reference. Preferably, linkage of the in-vehicle components of system 10 is at least partially, and preferably substantially, via linkage to a vehicle bus system or network such as a CAN or LIN system such as disclosed in commonly assigned U.S. patent application Ser. No. 60/196,577, filed Mar. 31, 2000, by Lynam et al. for a DIGITAL ELECTROCHROMIC CIRCUIT WITH A VEHICLE NETWORK SUCH AS A CAR AREA NETWORK OR A LOCAL INTERCONNECT NETWORK (Attorney Docket No. DON01 P-814), the disclosure of which is hereby incorporated herein by reference.

Optionally, rearview mirror assembly 19 includes at least one map/reading/courtesy light, most preferably comprising a non-incandescent lamp such as a light-emitting diode (LED) array (most preferably, each such array comprising at least one, and more preferably a plurality of at least two, white light-emitting diodes such as are disclosed in U.S. patent application Ser. No. 09/249,979 titled "Lighting Device for Motor Vehicles" by Peter Furst and Harald Buchalla, filed February 1999, and assigned to Donnelly Hohe GMBH & CO, KG, the entire disclosure of which is hereby incorporated by reference herein). Suitable white light-emitting diodes are available from Nichia America Corp. of Mountville, Pa. under the trade designation Nichia NSPW500BS, 5.6 C. P. White. Preferably, such mirror-mounted map lights comprise a removable combined flashlight/map light that uses at least one white light-emitting LED light source, more preferably at least two white light-emitting LED light sources, and most preferably at least three white light-emitting LED light sources as the lamp for illumination purposes, and such as is described in U.S. patent application Ser. No. 09/449,121 filed Nov. 24, 1999, by Hutzel et al. for a REARVIEW MIRROR ASSEMBLY WITH UTILITY FUNCTIONS, now U.S. Pat. No. 6,428,172, the disclosure of which is hereby incorporated herein by reference. Other non-incandescent light sources can be used for mirror-mounted lights (both interior rearview mirror assembly-mounted illuminators and exterior sideview mirror assembly-mounted illuminators). For example, fluorescent light sources such as cold-cathode fluorescent lamps can be used.

Alternately, luminescent light sources such as comprising an inorganic electroluminescent light source or, preferably, an organic electroluminescent light source can be used in map/reading/courtesy lighting in automotive rearview mirror assemblies and in security lighting/ground illumination and signal lighting in exterior sideview mirror assemblies. Also, a laser light source, or a multiple-laser light source can be used for illumination from automotive mirror assemblies, such as for map, reading and/or courtesy lighting at, in or on an interior rearview mirror assembly or for security lighting/ground illumination lighting from, or signal lighting from, an exterior sideview mirror assembly. Laser lighting can also be used to provide illumination for vehicle-mounted cameras, such as back-up cameras or forward-facing cameras or interior cabin monitoring cameras such as baby monitoring cameras such as are disclosed in provisional patent application Ser. No. 60/186,520, filed Mar. 1, 2000, by Lynam et al. entitled INTERIOR REARVIEW MIRROR ASSEMBLY INCORPORATING A VIDEO SCREEN (Attorney Docket No. DON01 P-802), application Ser. No. 09/466,010 filed Dec. 17, 1999, by DeLine et al. for an INTERIOR REARVIEW MIRROR SOUND PROCESSING SYSTEM, now U.S. Pat. No. 6,420,975, and application Ser. No. 09/396,179 filed Sep. 14, 1999, now U.S. Pat. No. 6,278,377, Ser. No. 09/382,720 filed Aug. 25, 1999, now U.S. Pat. No. 6,243,003, Ser. No. 09/449,121 filed Nov. 24, 1999, now U.S. Pat. No. 6,428,172, Ser. No. 09/433,467 filed Nov. 4, 1999, now U.S. Pat. No. 6,326,613, and Ser. No. 09/448,700 filed Nov. 24, 1999, now U.S. Pat. No. 6,329,925, the disclosures of which are hereby incorporated herein by reference.

For night vision purposes (such as with forward-facing cameras or when viewing a child at night in a darkened vehicle cabin or trapped in a darkened vehicle trunk compartment), use of near-infrared light-emitting sources, and in particular near-IR emitting LEDs and lasers, is desirable in order to provide illumination for a night-viewing camera while avoiding glaring with visible light, as disclosed in commonly assigned patent application Ser. No. 08/952,026 filed Nov. 19, 1997, by Schofield et al. for a REARVIEW VISION SYSTEM FOR VEHICLE INCLUDING PANORAMIC VIEW, the disclosure of which is hereby incorporated herein by reference. Where multiple laser sources are used, the light output of lasers emitting light of different non-white colors (for example, three blue emitting lasers and three amber lasers) can be combined to illuminate with metameric white light such as is described in U.S. Pat. No. 5,803,579 to Turnbull et al. and in U.S. Pat. No. 5,136,483 to Schoniger et al., the entire disclosures of which are hereby incorporated by reference herein. Such laser automotive lighting, and preferably white-light laser lighting, can be used in a variety of automotive lighting applications besides mirror-mounted lighting, such as laser-lighted automotive vanity mirrors, dome lights, parking lights, CHMSL lights, reversing lights, running board lights, side marker lights, turn signal lights, brake lights, fog lights, taillights, rail lamps, headlights, spotlights, ashtray lights, trunk compartment lights, storage compartment lights, console lights, and the like. Also, optionally and preferably, a light pipe and/or optical elements such as lenses, diffusers and reflectors can be used in conjunction with a laser light source, preferably a white-light producing laser source, in order to distribute/project light within or out from the vehicle, and/or to expand or direct/project the laser-generated light beam. Most preferably, at least one diffractive optical element is used in conjunction with an automotive laser light source.

Vehicle 12 as shown in FIG. 1 preferably includes a voice acquisition system, a voice recognition system and/or a voice generation system, such as are described in application Ser. No. 09/466,010 filed Dec. 17, 1999, by DeLine et al. for an INTERIOR REARVIEW MIRROR SOUND PROCESSING SYSTEM, now U.S. Pat. No. 6,420,975, and application Ser. No. 09/396,179 filed Sep. 14, 1999, now U.S. Pat. No. 6,278,377, Ser. No. 09/382,720 filed Aug. 25, 1999, now U.S. Pat. No. 6,243,003, Ser. No. 09/449,121 filed Nov. 24, 1999, now U.S. Pat. No. 6,428,172, Ser. No. 09/433,467 filed Nov. 4, 1999, now U.S. Pat. No. 6,326,613, Ser. No. 09/448,700 filed Nov. 24, 1999, now U.S. Pat. No. 6,329,925, the disclosures of which are hereby incorporated herein by reference. Preferably, mirror 19 includes a digital sound processing system comprising multiple microphones and a digital signal processor. Most preferably, vehicle 12 is also equipped with a vehicular language translation system. Such a language translation system is capable of receiving data intended for display or play back in a particular language (for example, English), and converting this data to a different language (for example, German), and displaying and/or audibly voice generating that data in that different language. Thus, for example, a German-speaking tourist renting a vehicle in Chicago, USA could have the data from a map database (or any other source of information/data) translated from English to German by that tourist activating the German translation function of the language translation system in the vehicle. Preferably, the language translation system in the vehicle includes a wireless telecommunication link to a translation service remote from the vehicle. Preferably, at least the microphone of the language translation system is mounted at, on, within or local to the interior rearview mirror assembly of the vehicle. Most preferably, the voice acquisition for the vehicular language translation system is located at the interior mirror assembly, such as is disclosed in U.S. patent application Ser. No. 09/466,010 filed Dec. 17, 1999, by DeLine et al. for an INTERIOR REARVIEW MIRROR SOUND PROCESSING SYSTEM, now U.S. Pat. No. 6,420,975, the entire disclosure of which is hereby incorporated by reference herein. Thus, most preferably, the vehicle-based input to such a system and/or other in-vehicle components useful in the present invention are located at, within or on the interior rearview mirror assembly (which may be of the prismatic-type or of the electro-optic type, preferably an electrochromic interior rearview mirror assembly). Preferred modes of data input to an interior mirror assembly (useful with any of the systems of the present invention) are disclosed in commonly assigned applications Ser. No. 60/192,721, filed Mar. 27, 2000, by Lynam et al. for an INTERFACE AUTOMOTIVE REAR VISION SYSTEM (Attorney Docket No. DON01 P-815) and Ser. No. 09/448,700 filed Nov. 24, 1999, by Skiver et al. for a REARVIEW MIRROR ASSEMBLY WITH ADDED FEATURE MODULAR DISPLAY, now U.S. Pat. No. 6,329,925, the disclosures of which are hereby incorporated herein by reference.

Also, the present invention includes an adaptive vehicular telecommunication system that includes providing a position locator and remote data source (and with the remote data source such as a map database provided from a site external to the vehicle and in wireless communication with the vehicle), determining at least one of a vehicle parameter and a personal parameter, and transferring data from the remote data source to the vehicle at a resolution that is a function of at least one of a vehicle parameter and a personal parameter. Also, the present invention includes an adaptive vehicular telecommunication system that includes providing a position locator and remote data source (and with the remote data source such as a map database provided from a site external to the vehicle and in wireless communication with the vehicle), determining at least one of a vehicle parameter and a personal parameter, transferring data from the remote data source to the vehicle, and displaying that transferred data within that vehicle at a resolution that is a function of at least one of a vehicle parameter and a personal parameter. The adaptive vehicular telecommunication system of the present invention displays data within the vehicle such as, most preferably, at an interior mirror assembly-mounted display; or at a display mounted at, on, within or proximate to the instrument panel of the vehicle or mounted at a roof portion of the vehicle such as a header console; or as a heads-up display, preferably a heads-up video display viewable by looking forward through the front windshield of the vehicle. The adaptive vehicular telecommunication system of the present invention displays the data within the vehicle with a display characteristic (such as display resolution, display detail, display brightness, and the like) that is a function of at least a navigational characteristic of the vehicle (such as the geographic location of the vehicle or the directional heading of the vehicle or the altitude of the vehicle) as determined by an in-vehicle navigation system (preferably a GPS system).

Preferably, the adaptive vehicular telecommunication system of the present invention displays the data within the vehicle with a display characteristic (such as display resolution, display detail, display brightness, and the like) that is a function of at least a navigational characteristic of the vehicle (such as the geographic location of the vehicle or the directional heading of the vehicle or the altitude of the vehicle) as determined by an in-vehicle navigation system (preferably a GPS system), and includes a two-way wireless telecommunication link to a data source (such as an ONSTAR™ telematic service or a Web site or an external computer or a traffic control center or a train system control center or a PDA or a cellular phone or a security or child monitoring camera-based video monitoring system such as in a home, office or factory) that is remote, distant from and external to the vehicle, and with that remote data source at least partially providing the data displayed in the vehicle (or presented in the vehicle such as by audible voice generation) by wireless communication from the data source. The in-vehicle display of data by the adaptive vehicular telecommunication system of the present invention is dynamically responsive to a vehicle parameter and/or to a personal parameter.

Thus, it is seen that the present application discloses many useful methods and systems for vehicle-based navigation systems and for adaptive vehicular telecommunication systems. Such methods and systems are useful individually or in combination as will be apparent to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of navigating when driving a vehicle, comprising:

providing a position locator and a display in the vehicle;

providing a map database;

providing a vehicle-based navigation system and a communication link, said communication link comprising a wireless communication link between the vehicle and the map database, said map database being located exteriorly of and remote from the vehicle when the vehicle is traveling, said communication link providing information to said map database chosen from:

(1) driver information, said driver information including at least one of driver preference information, driver experience information, the driver's language information, the driver's identity information, the driver's national identity information, and driver authorization information; and (2) vehicle information, said vehicle information including at least one of the vehicle geographic location information, the speed of the vehicle information, the vehicle heading information, the vehicle altitude information, the vehicle inclination information, the vehicle type information, and the vehicle equipment information;

determining a position of the vehicle with said position locator;

determining at least one of a vehicle parameter and a personal parameter based on said information; and transferring map data from said map database to the vehicle, and said display displaying at least a portion of the transferred map data at a resolution that dynamically varies as a function of said at least one of a vehicle parameter and a personal parameter, said portion of the transferred map data being associated with the position of the vehicle.

2. The method of navigating in claim 1 in which said portion of the data displayed pertains to an area local to said position of the vehicle, said area being a function of said at least one of a vehicle parameter and a personal parameter.

3. The method of navigating in claim 2 wherein said area is larger in a direction of vehicle travel than in an opposite direction thereof.

4. The method of navigating in claim 1 including displaying an output of said position locator with said display.

5. The method of navigating in claim 1 wherein said vehicle parameter comprises the speed of the vehicle and including displaying data at a higher resolution for lower speeds and at a lower resolution for higher speeds.

6. The method of navigating in claim 1 wherein said position locator comprises one of a global positioning system receiver, a signal triangulator, a compass-based system, and an inertial navigation system.

7. The method of navigating in claim 1 wherein said vehicle parameter comprises the speed of the vehicle.

8. The method of navigating in claim 7 wherein speed of the vehicle is determined from a GPS signal.

9. The method of navigating in claim 7 including providing a portable device having another position locator and a port in said vehicle providing communication between said portable device and said position locator.

10. The method of navigating in claim 9 including transferring data to said portable device through said port.

11. The method of navigating in claim 9 including providing a communication link between said vehicle and said portable device and transferring data between said vehicle and said portable device through said communication link when said portable device is not connected with said port.

12. The method of navigating in claim 9 including determining a position of said vehicle when said portable device is in communication with said port using said position locator and said another position locator in combination.

13. The method of navigating in claim 12 including determining a position of said vehicle using one of said position locator and said another position locator.

14. The method of navigating in claim 13 including determining which of said position locator and said another position locator is more accurately determining position.

15. The method of navigating in claim 9 wherein said portable device comprises one of a cellular telephone, a radio, a personal digital assistant, a computer and a pager.

16. The method of navigating in claim 9 wherein said another position locator comprises one of a global positioning system receiver, a signal triangulator, a compass-based system, and an inertial navigation system.

17. The method of navigating in claim 7 wherein said transferring data includes transferring data from a map located off-vehicle to the vehicle using a communication link.

18. The method of navigating in claim 1 wherein said personal parameter comprises at least one parameter selected from the group consisting of (i) driver personal identity, (ii) driver/occupant preference for a particular level of map resolution, (iii) driver authorization, (iv) driver credit, (v) driver national identity and (vi) driver linguistic.

19. The method of navigating in claim 18 wherein said personal parameter is manually input.

20. The method of navigating in claim 18 wherein said personal parameter is stored in a memory.

21. The method of navigating in claim 1 wherein said vehicle parameter comprises at least one parameter selected from the group consisting of (i) vehicle location; (ii) vehicle model; (iii) vehicle equipment type; (iv) vehicle direction of travel; (v) vehicle authorization; (vi) weather condition; (vii) traffic conditions; and (viii) time.

22. A method of navigating, comprising:

providing a map store that is adapted to store map data;

providing a vehicle having a navigational system including a position locator, said map store being located exteriorly and remote from the vehicle;

providing communication between said navigational system and said map store to download map data to said navigational system, and to download information chosen from driver information and vehicle information to said map store, said map store selecting said map data based on said information;

providing a portable device having another position locator; and providing communication between said portable device and said navigational system to download map data to said portable device from said navigational system.

23. The method of navigating in claim 22 wherein said portable device can be removably coupled with the vehicle and wherein said downloading data includes transferring high resolution data to said portable device when said portable device is coupled with said vehicle.

24. The method of navigating in claim 22 wherein said portable device can be removably coupled with the vehicle and wherein data can be transferred between said vehicle and said portable device when said portable device is not coupled with said.

25. The method of navigating in claim 22 including determining a position of said vehicle when said portable device is connected with said port using said position locator and said another position locator in combination.

26. The method of navigating in claim 25 including determining a position of said vehicle using one of said position locator and said another position locator.

27. The method of navigating in claim 26 including determining which of said position locator and said another position locator is more accurately determining position.

28. A method of navigating, comprising:

providing a vehicle having a navigational system including a position locator in the vehicle;

providing a portable personal device having another position locator;

providing communication between said portable device and said navigation system; and determining a position of said vehicle by processing outputs of said position locator and said another position locator including determining which of said position locator and said another position locator is more accurately determining position.

29. The method of navigating in claim 28 wherein at least one of said position locator and said another position locator comprises one of a global positioning system receiver, a signal triangular, a compass-based system, and an inertial navigational system.

30. The method of navigating in claim 28 wherein said portable device comprises one of a cellular telephone, a radio, a personal digital assistant, a computer and a pager.

31. A vehicle navigation system suitable for use in a vehicle, comprising:
    a position locator in the vehicle and a map database;
    a control which determines a position of the vehicle from an output of said position locator and determines at least one of a vehicle parameter and a personal parameter, said control downloading data from said map database and downloading said at least one of a vehicle perimeter and a personal parameter to said map database; and
    a display in the vehicle displaying at least a portion of the downloaded data at a resolution that dynamically varies as a function of said at least one of a vehicle parameter and a personal parameter, said portion of the transferred data being associated with the position of the vehicle.

32. The navigation system in claim 31 in which the data displayed by said display pertains to an area local to the vehicle, said area being a function of said at least one of a vehicle parameter and a personal parameter.

33. The navigation system in claim 32 wherein said area is larger in a direction of vehicle travel than in an opposite direction thereof.

34. The navigation system in claim 31 wherein said display also displays an output of said position locator.

35. The navigation system in claim 31 wherein said vehicle parameter comprises the speed of the vehicle and wherein data is transferred at a higher resolution for lower speeds and at a lower resolution for higher speeds.

36. The navigation system in claim 31 wherein said position locator comprises one of a global positioning system receiver, a signal triangulator, a compass-based system, and an inertial navigation system.

37. The navigation system in claim 31 wherein said vehicle parameter comprises the speed of the vehicle.

38. The navigation system in claim 37 wherein speed of the vehicle is determined from a GPS signal.

39. The navigation system in claim 37 including a portable device having another position locator and a port in said vehicle providing communication between said portable device and said position locator.

40. The navigation system in claim 39 wherein data is transferred to said portable device through said port.

41. The navigation system in claim 39 including a communication link between said vehicle and said portable device, wherein data is transferred between said vehicle and said portable device through said communication link when said portable device is not connected with said port.

42. The navigation system in claim 39 wherein a position of said vehicle is determined when said portable device is in communication with said port using said position locator and said another position locator in combination.

43. The navigation system in claim 42 wherein a position of said vehicle is determined using one of said position locator and said another position locator.

44. The navigation system in claim 43 wherein it is determined which of said position locator and said another position locator is more accurately determining position.

45. The navigation system in claim 39 wherein said portable device comprises one of a cellular telephone, a radio, a personal digital assistant, a computer, and a pager.

46. The navigation system in claim 39 wherein said another position locator comprises one of a global positioning system receiver, a signal triangulator, a compass-based system, and an inertial navigation system.

47. The navigation system in claim 37 wherein data is transferred from a map located off vehicle to the vehicle using a communication link.

48. The navigation system in claim 31 wherein said personal parameter comprises at least one parameter that is selected from the group consisting of (i) driver personal identity, (ii) driver/occupant preference for a particular level of map resolution, (iii) driver authorization, (iv) driver credit, (v) driver national identity and (vi) driver linguistic.

49. The navigation system in claim 48 wherein said personal parameter is manually input.

50. The navigation system in claim 48 wherein said personal parameter is stored in a memory.

51. The navigation system in claim 31 wherein said vehicle parameter comprises at least one parameter selected from the group consisting of (i) vehicle location; (ii) vehicle model; (iii) vehicle equipment type; (iv) vehicle direction of travel; (v) vehicle authorization; (vi) weather condition; (vii) traffic condition; and (viii) time.

52. A vehicular navigation system, comprising:
    a map store that is adapted to storing map data;
    a vehicle-based navigation system including a position locator, said vehicle-based navigation system located in a vehicle, and said map store located remotely from the vehicle;
    a first communication link between said navigation system and said map store to download map data to said navigation system and to download information chosen from at least one of vehicle information and driver information to said map store, said map data selected based at least in part on said information;
    a portable device having another position locator; and
    a second communication link between said portable device and said vehicle-based navigation system when said portable device is in communication with said navigation system to download said map data to said portable device from said navigation system.

53. The navigation system in claim 52 wherein a position of said vehicle is stored by said portable device when said portable device is not in communication with said navigation system.

54. The navigation system in claim 52 wherein said second communication link downloads high resolution data to said portable device port when said portable device is in communication with said navigation system.

55. The navigation system in claim 52 including a third communication link between said vehicle-based navigation system and said portable device, wherein data is transferred between said vehicle and said portable device through said third communication link when said portable device is not in communication with said navigation system through said second communication link.

56. The navigation system in claim 52 wherein a position of said vehicle is determined when said portable device is connected with said port using said position locator and said another position locator in combination.

57. The navigation system in claim 52 wherein a position of said vehicle is determined using one of said position locator and said another position locator.

58. The navigation system in claim 57 wherein a determination is made which of said position locator and said another position locator is more accurately determining position.

59. A vehicular navigation system, comprising:
- a vehicle-based navigational system including a position locator in the vehicle;
- a portable device having another position locator;
- a communication link between said portable device and said navigation system; and
- a control which determines a position of said vehicle by processing outputs of said position locator and said another position locator, wherein said control determines which of said position locator and said another position locator is more accurately determining position.

60. The navigation system in claim 59 wherein at least one of said position locator and said another position locator comprises one of a global positioning system receiver, a signal triangular, a compass-based system, and an inertial navigational system.

61. The navigation system in claim 59 wherein said portable device comprises one of a cellular telephone, a radio, a personal digital assistant, a computer and a pager.

* * * * *